United States Patent
Wild et al.

(10) Patent No.: US 6,588,261 B1
(45) Date of Patent: Jul. 8, 2003

(54) METHOD FOR DETERMINING THE AIR ENTERING THE CYLINDERS OF AN INTERNAL COMBUSTION ENGINE HAVING A SUPERCHARGER

(75) Inventors: Ernst Wild, Oberriexingen (DE); Lutz Reuschenbach, Stuttgart (DE); Nikolaus Benninger, Vahingen (DE); Werner Hess, Stuttgart (DE); Hong Zhang, Regensburg (DE); Georg Mallebrein, Singen (DE); Harald Von Hofmann, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,321
(22) PCT Filed: Mar. 24, 1998
(86) PCT No.: PCT/DE98/00862
§ 371 (c)(1),
(2), (4) Date: Jan. 10, 2000
(87) PCT Pub. No.: WO98/44250
PCT Pub. Date: Oct. 8, 1998

(30) Foreign Application Priority Data

Apr. 1, 1997 (DE) .......................... 197 13 379
Sep. 17, 1997 (DE) .......................... 197 40 914

(51) Int. Cl.$^7$ .......................... G01M 19/00; G06F 19/00
(52) U.S. Cl. .......................... 73/118.2; 701/101
(58) Field of Search .......................... 73/118.1, 116, 73/118.2, 117.2, 117.3; 701/100, 101, 103, 104, 105, 111; 340/649

(56) References Cited

U.S. PATENT DOCUMENTS 5,191,789 A  *  3/1993  Furuya .......................... 73/118.2
5,339,681 A  *  8/1994  Sekozawa et al. .......... 73/118.2

FOREIGN PATENT DOCUMENTS

| DE | 32 38 190 | 4/1984 | |
| EP | 0 345 524 | 12/1989 | |
| EP | 0345524 A1 * | 12/1989 | G01F/1/00 |
| WO | 96 32579 | 10/1996 | |

* cited by examiner

Primary Examiner—Eric S. McCall
Assistant Examiner—Maurice Stevens
(74) Attorney, Agent, or Firm—Kenyon & Kenyon

(57) ABSTRACT

A device for determining air entering cylinders of an internal combustion engine having a supercharger. The air is determined as a function of such quantities as rpm, air throughput in the intake manifold, throttle valve position values and temperature, characterized in that at least the following physical relationships are included in the determination:
    suction equation of the engine
    balancing equation for a filling in an intake manifold
    flow rate equation at a throttle valve
    balancing equation in a volume between the throttle valve and the supercharger.

19 Claims, 3 Drawing Sheets

METHOD FOR DETERMINING THE AIR ENTERING THE CYLINDERS OF AN INTERNAL COMBUSTION ENGINE HAVING A SUPERCHARGER

FIELD OF THE INVENTION

The present invention relates to a method for determining the air entering the cylinders of an internal combustion engine having a supercharger.

BACKGROUND INFORMATION

German Patent No. 32 38 190 describes an "Electronic System for Controlling or Regulating Performance Characteristics of an Internal Combustion Engine." Specifically, it describes a method of determining the pressure in the intake manifold on the basis of the rpm and the air flow rate in the intake manifold and conversely the air flow rate on the basis of the rpm and pressure. The method described therein makes use specifically of physical relationships prevailing in the air intake manifold with the goal of optimal control of the internal combustion engine.

International Patent Publication No. WO96/32579 describes a method of model-supported determination of the air entering the cylinders of an internal combustion engine. To do so, a physical model is crated, describing the relationships in the intake system of an internal combustion engine without a supercharger, using parameters representing the degree of opening of the throttle valve, the ambient pressure and the valve position as input quantities of the model. In addition, the instantaneous value determined for the air entering the cylinders of the internal combustion engine is used to predict future values.

The conventional system cannot be used with supercharged internal combustion engines, because additional physical factors must also be taken into account due to the supercharging.

SUMMARY OF THE INVENTION

Therefore, an object of the present invention is to provide a device for determining the air entering the cylinders of an internal combustion engine having a supercharger as a function of quantities such as rpm, air throughput in the intake manifold, throttle valve position values and temperature which comprehensively take into account the physical processes taking place in supercharged internal combustion engines.

With this device according to the present invention, it is possible to determine the physically correct or at least approximate relationships prevailing in the intake manifold of an internal combustion engine having a supercharger, and then to base the determination of the quantity of fuel accordingly.

DETAILED DESCRIPTION

Figure 1:
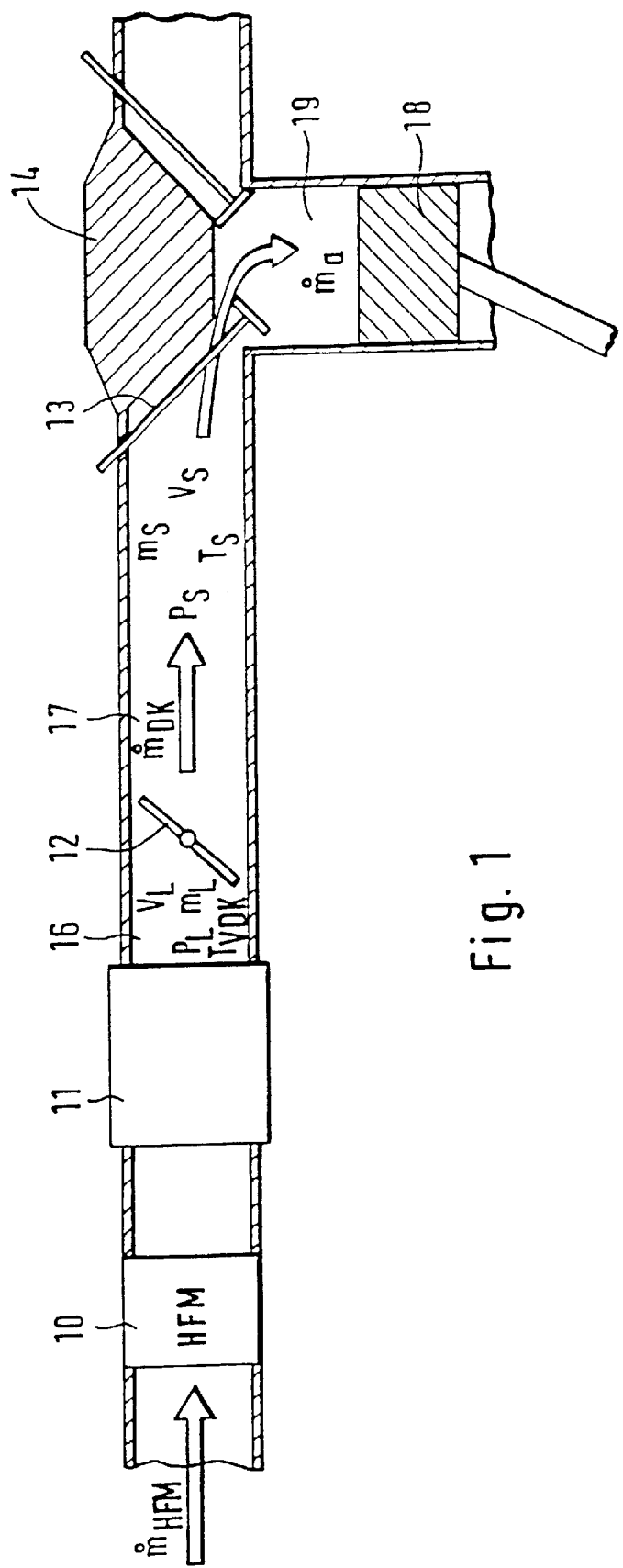
FIG. 1 shows a survey diagram of an internal combustion engine having a supercharger.

FIG. 1 shows in a rough survey diagram the input side of an internal combustion engine having a supercharger. As seen in the direction of flow, the air intake manifold includes a hot film air flow meter 10 (HFM), a supercharger or compressor 11, a throttle valve 12 and an intake valve 13 of internal combustion engine 14. One volume 16 between supercharger 11 and the throttle valve and an additional volume 17 between the throttle valve and intake valve 13 are also important for an understanding of the present invention. The internal combustion engine itself has a piston 18 for each cylinder, with the low position of the piston characterizing piston displacement 19.

FIG. 1 shows that the relationships in the intake manifold can be characterized by

- a suction equation for the internal combustion engine (air flow through intake valve 13),
- a balancing equation for the filling in the intake manifold between the throttle valve and the intake valve (volume 17),
- a flow equation at throttle valve 12 and
- a balancing equation in volume 16 between supercharger 11 and throttle valve 12.

The equations are based on a two-mass storage model, with the two mass storages indicating the volumes upstream and downstream from the throttle valve (16, 17).

It has proven expedient to use standardized values for the equations.

In particular, the goal is to assume mass contents ml in volume 16 upstream from throttle valve 12 and ms in volume vs 17 downstream from the throttle valve, to convert the mass contents into pressures upstream and downstream from the throttle valve and to determine on the basis of these two pressures mass flows which in turn permit updating of the mass contents. The individual calculations are to be performed in iterative processes with assumptions for the output data.

Figure 2:
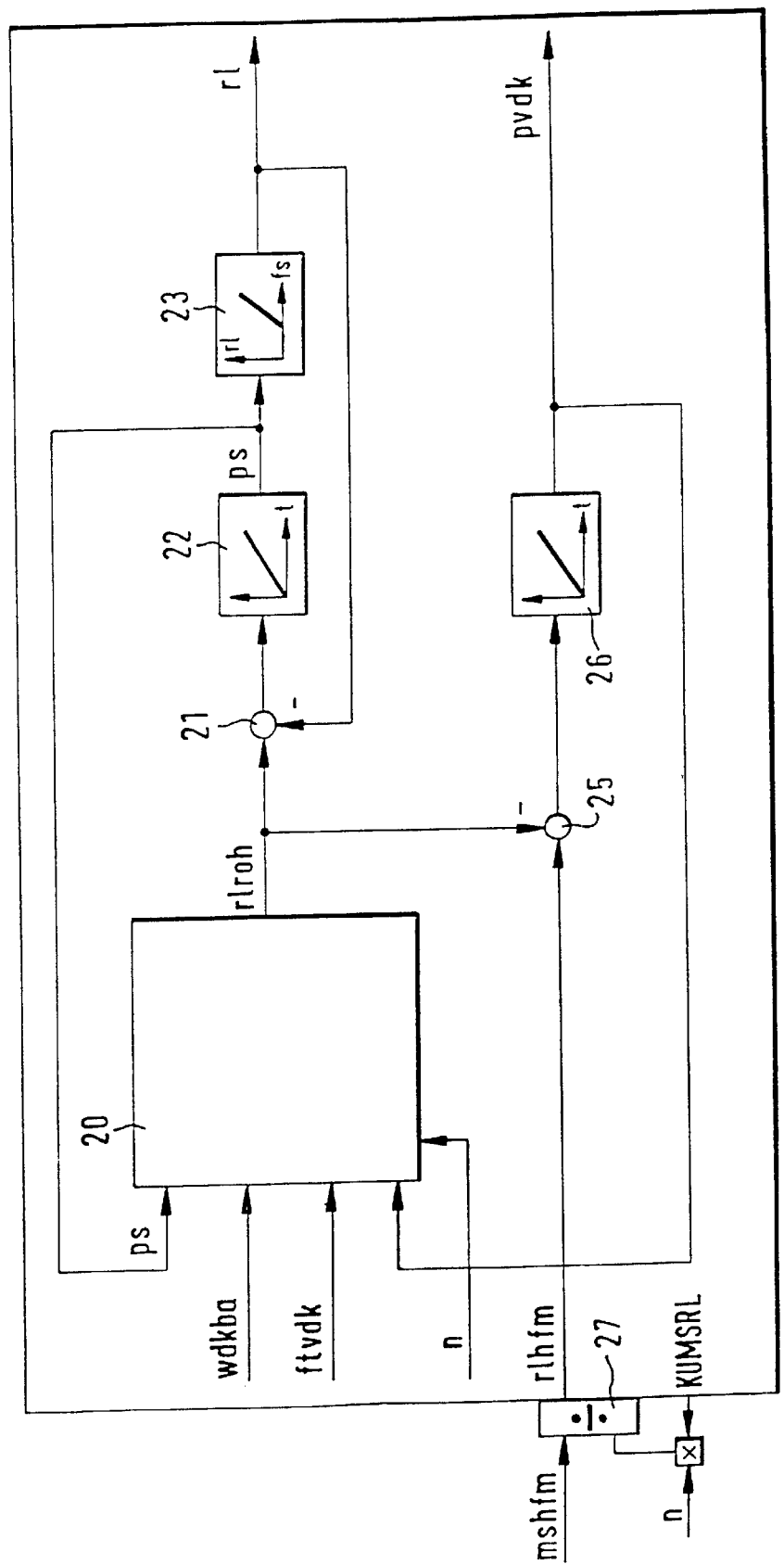
FIG. 2 shows a block diagram of a determination of a relative filling per stroke on a basis of standardized quantities for a throttle valve angle, temperature of an intake air upstream from the throttle valve, a mass flow over a hot film air flow meter and an rpm.
Figure 3:
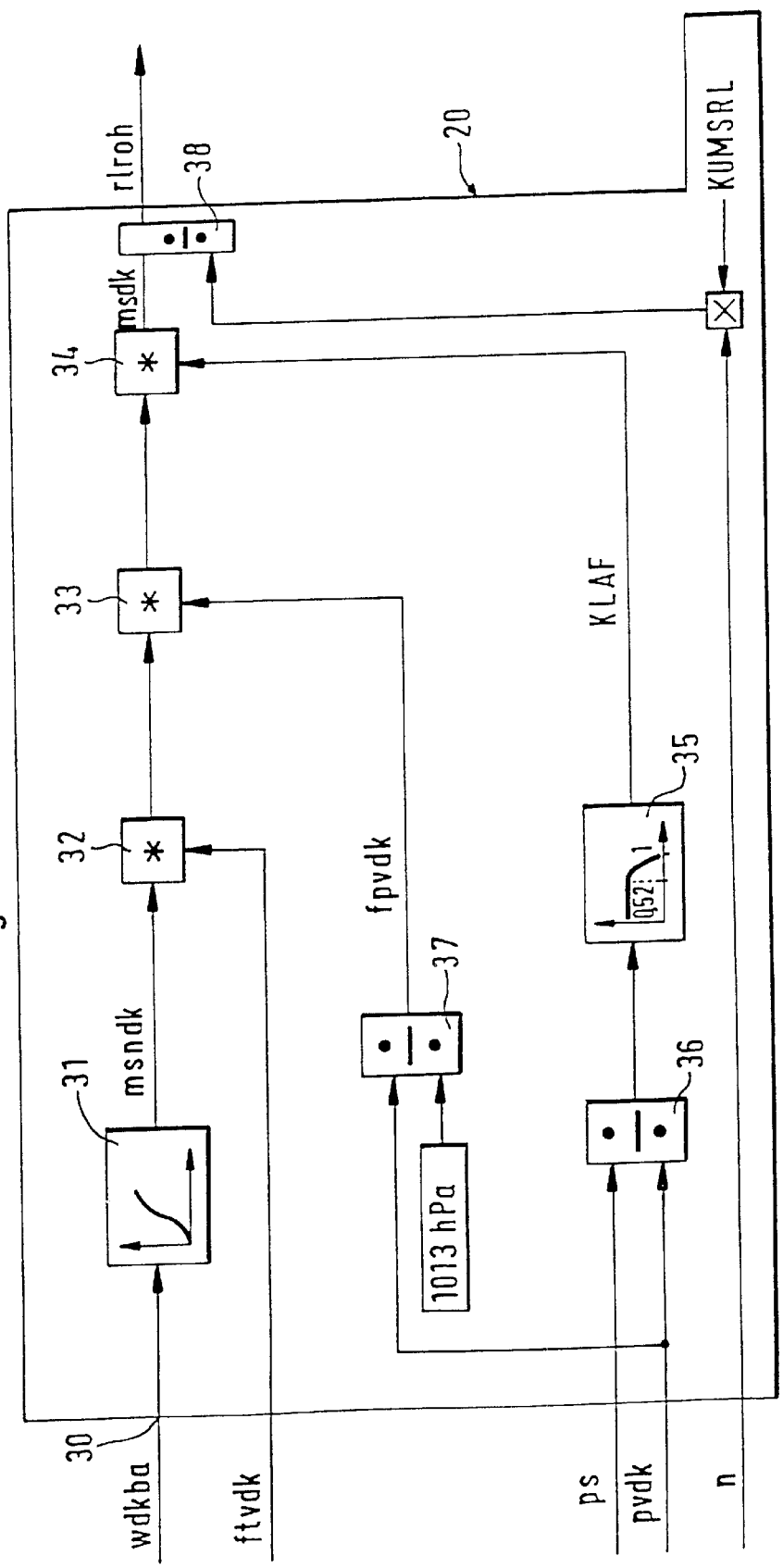
FIG. 3 shows a block diagram for calculation of a mass flow over a throttle valve.

FIGS. 2 and 3 show details of the computation steps.

FIG. 2 shows a block diagram for determination of the relative filling per stroke (rl), based on standardized quantities for the throttle valve angle, the temperature of the intake air upstream from the throttle valve, the mass flow through the hot film air flow meter (HFM) and the rpm. A block 20 is shown for calculating the throttle valve flow rate, representing the flow equation through the throttle valve. Its input variables are the modeled quantity of intake manifold pressure ps, the measured angle of the throttle valve based on its stop (wdkba), a standardized factor ftvdk, which is based on the measured temperature of the intake air upstream from the throttle valve, a modeled pressure (pvdk) upstream from the throttle valve and the rpm (n). At the output, the relative air mass per stroke through the throttle valve (rlroh) is obtained. This is followed by a difference forming position 21 and then an integrator 22, both of which represent the balancing equation for the pressure in the intake manifold. At the output of integrator 22, signal ps is available as an input quantity for block 20 as well as a characteristic curve 23. Characteristic curve 23 with its relationship between ps and the relative filling per stroke rl represents the suction equation of the combustion chamber. Output signal rl is also sent to difference forming position 21.

The balancing equation in the volume upstream from the throttle valve is implemented by a difference forming position 25 together with a downstream integrator 26. The additive input quantity of difference forming position 25 is a signal rlhfm of the relative filling through HFM; this signal originates from a division block 27 whose input quantities are the HFM signal (mass flow HFM, mshfm) and an rpm signal n multiplied by a factor KUMSRL (constant for converting from mass flow to relative air filling in the combustion chamber). The output quantity of integrator 26 is signal pvdk (pressure upstream from the throttle valve) which forms the corresponding input quantity of block 20.

An implementation of block 20 from FIG. 2 is shown in FIG. 3.

An input 30 for quantity wdkba is followed by a valve characteristic curve 31 which forms a signal based on standardized angle signal wdkba concerning a standardized mass flow msndk through the throttle valve. This standardization also applies to an air temperature of 273° K. and a pressure of 1013 hPa upstream from the throttle valve. This is followed by multiplication position 32 with additional input signal ftvdk, multiplication position 33 with signal fpvdk, and multiplication position 34 with the output signal of a characteristic curve 35 whose input quantity is the division result between modeled pressure ps and modeled pressure pvdk (block 36). The second input signal of multiplication position 33 is fpvdk as the result of a division of input quantity pvdk divided by a standard pressure of 1013 hPa (block 37). Output signal msdk (mass flow through the throttle valve) of multiplication position 34 subsequently undergoes division by the product of rpm n and factor KUMSRL in a block 38. The result of this division is signal rlroh as the relative filling value through the throttle valve.

On the basis of the physical conditions, rlhfm=rlroh=rl in steady-state operation, i.e., the air flow rate measured by HFM corresponds to the mass flow through the throttle valve and the mass flow in the combustion chamber. In the case of non-steady-state operation, the integrators simulating the individual air mass storages play a role.

The following equations are used in particular:

Suction equation of the internal combustion engine in general:

$$ma\_Punkt=(ps-pirg)*n*(VH/2)/(R*Ts)$$

where ma_Punkt=air flow rate sucked from the combustion chamber ps=intake manifold pressure pirg=partial pressure caused by residual gas in the combustion chamber n=rpm VH=piston displacement of the engine Ts=gas temperature in the intake manifold.

Conversion from mass flow ma_Punkt to air mass ma in the combustion chamber and division by rpm n:

$$ma = \text{air mass in the combustion chamber}$$
$$= ma\_Punkt/n$$
$$= (ps - pirg)*(VH/2)/(R*Ts).$$

Standardized quantities are used for the control unit: standard air mass in the combustion chamber $$m\_norm=(Pn*VH/2)/(R*Tn).$$

Definition of rl as the relative air filling in the combustion chamber:

$$rl = ma/m\_norm$$
$$= (ps - pirg)*Tn/(Pn*Ts)$$

under the standard conditions: Tn=273 K, Pn=1013 hPa where $$fupsrl = \text{factor for converting pressure in the intake manifold}$$
$$\text{into relative air filling in the combustion chamber}$$
$$= Tn/(pn*Ts)$$

the suction equation is obtained in control unit quantities as $$rl=(ps-pirg)*fupsrl.$$

Balancing equation for the filling in the intake manifold (volume 17) in general (implemented by addition position 21 with a downstream integrator 22):

$$d(ms)/dt=mdk\_Punkt-ma\_Punkt.$$

With standardized control quantities $$d(ms/m\_norm)/dt=(mdk\_Punkt-ma\_Punkt)/m\_norm$$

and $$rl\_Punkt=ma\_Punkt/m\_norm$$

and $$rlroh\_Punkt=mdk\_Punkt/m\_norm$$

it holds that:

$$d(ms/m\_norm)/dt=rlroh\_Punkt-rl\_Punkt.$$

The gas equation yields the relationship between air mass ms in the intake manifold and intake manifold pressure ps:

$$ps*Vs=ms*R*Ts.$$

Solving for ms yields:

$$ms=(ps*Vs)/(R*Ts).$$

Based on a standard mass, this yields:

$$ms/m\_norm = ((ps*Vs)/(R*Ts))*((R*Tn)/(Pn*VH/2))$$
$$= (ps*VS*Tn)/(Pn*VH/2*Ts).$$

Inserting this into the standardized balancing equation yields:

$$d*((ps*Vs*Tn)/(Pn*VH/2*Ts))/dt=(rlroh\_Punkt-rl\_Punkt).$$

This yields:

$$d*ps/dt=(rlroh\_Punkt-rl\_Punkt)*((VH/2*Ts*Pn)/(Vs*Tn)).$$

With $$rl\_Punkt=rl*n$$

and $$rlroh\_Punkt=rlroh*n$$

this yields:

$$d*ps/dt=((VH/2*Ts*Pn*n)/(Vs*Tn))*(rlroh-rl).$$

Finally, with substitution, this yields:

$KIS$ = integration constant for the intake manifold model $= (VH/2 * Ts * Pn * n)/(Vs * Tn)$ the control unit equation in differential form $d*ps/dt = KIS*(rlroh-rl)$ and in integral form $ps = KIS*\text{integral}((rlroh-rl)*dt.$ Flow rate equation for the throttle valve (block 20, individual elements in FIG. 3) in general:

$msdk(wdkba) = pvdk*(1/(R*Tvdk))**(1/2)*Adk(wdkba)*my*Xi(Ps/pvdk)*k$ where
  msdk: mass flow through the throttle valve
  wdkba: throttle valve angle based on stop
  pvdk: pressure upstream from the throttle valve
  Tvdk: temperature upstream from the throttle valve
  Adk: cross-section of the opening of the throttle valve
  my: coefficient of friction
  Xi: outflow characteristic curve.

The throttle valve is measured as a function of the throttle valve angle under standard conditions:

$msndk(wdkba) = pn*(1/(R*Tn))**(1/2)*Adk(wdk)*my*Xi(Psn/pvdk)*k.$

With the following substitutions:
fpvdk = pvdk/Pn
ftvdk = (Tn/Tvdk)**(1/2)
KLAF = Xi(ps/pl)/Xi(psn/pl)
psn = standard pressure downstream from the throttle valve
the quotient msdk(wdkba)/msndk(wdkba) from the two equations yields the relationship:

$msdk(wdkba) = msndk(wdkba)*ftvdk*fpvdk*KLAF.$

This yields the value for rlroh at the output of division position 38 from FIG. 3 as follows:

$rlroh = msdk/(n* KUMSRL)$ where
  KUMSRL = conversion constant.
  Balancing equation in volume 16 between the throttle valve and the supercharger (addition position 25 and integrator 26 from FIG. 3) in general:

$d(ml)/dt = mhfm\_Punkt - mdk\_Punkt.$

With standardized control quantities, this yields:

$d(ml/m\_norm)/dt = (mhfm\_Punkt - mdk\_Punkt)/m\_norm$

If $rlhfm\_Punkt = mhfm\_Punkt/mnorm$ and $rlroh\_Punkt = mdk\_Punkt/m\_norm$ then it follows that:

$d(ml/m\_norm)/dt = rlhfm\_Punkt - rlroh\_Punkt.$

The relationship between air mass ml in the boost volume and boost pressure pl yields the gas equation:

$pl*Vl = ml*R*Tl.$

Solving for ml yields:

$ml = (pl*Vl)/(R*Tl).$

Based on a standard mass, this yields:

$ml/m\_\text{norm} = ((pl*Vl)/(R*Tl))*((R*Tn)/(Pn*VH/2))$ $= (pl*Vl*Tn)/(Pn*VH/2*Tl).$ Inserting into the standardized balancing equation $d(ml/m\_norm)/dt = rlroh\_Punkt - rl\_Punkt$ and solving for $d(pl)/dt$ yields:

$d(pl)/dt = (rlroh\_Punkt - rl\_Punkt)/(VH/2*Tl*Pn)/(Vl*Tn).$

With rlhfm_punkt = rlhfm*n
and rlroh_punkt = rlroh*n
and the substitution $KIL$ = integration constant for the boost volume $= (VH/2*Tl*Pn*n)/(Vl*Tn)$ this yields the control unit equation in differential form:

$d(pl)/dt = KIL*(rlhfm - rlroh)$ and in integral form $pl = KIL*\text{integral}(rlhfm - rlroh)*dt.$

What is claimed is:
1. A method of determining air entering cylinders of an internal combustion engine having a supercharger, comprising the steps of:
  using a suction equation to represent a first relationship between a relative filling per stroke and an intake manifold pressure;
  using a first balancing equation for a filling in an intake manifold to represent a second relationship between the intake manifold pressure, a relative air mass per stroke through a throttle valve, and the relative filling per stroke;
  using a flow rate equation at the throttle valve to represent a third relationship between the relative air mass per stroke through the throttle valve, a mass flow through the throttle valve, and an rpm of the internal combustion engine;
  using a second balancing equation in a first volume between the throttle valve and the supercharger to represent a fourth relationship between an air mass entering the internal combustion engine, the relative air mass through the throttle valve, and one of a boost pressure and a pressure upstream from the throttle valve; and
  determining the air using the suction equation, the first balancing equation, the flow rate equation, and the second balancing equation, the air being determined as a function of at least the rpm, an air throughput in the intake manifold, throttle valve position values and temperature, the suction equation, the first and second balancing equations, and the flow rate equation using values based on standard conditions for the equations.

2. The method according to claim 1, further comprising the steps of:
basing the suction equation, the first balancing equation, the flow rate equation, and the second balancing equation on a two-mass storage model;
forming a first mass using a first air mass in a volume upstream from the throttle valve; and
forming a second mass using a second air mass in a volume downstream from the throttle valve.

3. The method according to claim 1, further comprising the step of:
performing individual calculations by iterative processes with assumptions for output data.

4. The method according to claim 1, further comprising the step of:
calculating a throttle valve flow rate using the flow rate equation and two modeled pressure values, the two modeled pressure values being derived from the first balancing equation and the second balancing equation.

5. The method of claim 1, wherein the suction equation is a function of the intake manifold pressure.

6. The method of claim 5, wherein the suction equation is further a function of a partial pressure caused by residual gas in a combustion chamber.

7. The method of claim 6, wherein the suction equation is further a function of the rpm.

8. The method of claim 7, wherein the suction equation is further a function of a piston displacement.

9. The method of claim 1, wherein the suction equation is defined by the equation $ma\_punkt=(ps-pirg)*n*(VH/2)/(R*Ts)$, in which ma_Punkt is an air flow rate sucked from a combustion chamber, ps is the intake manifold pressure, pirg is a partial pressure caused by residual gas in the combustion chamber, n is the rpm, VH is a piston displacement, and Ts is a gas temperature in the intake manifold.

10. The method of claim 1, wherein the relationship defined by the suction equation is $rl=(ps-pirg)*fupsrl$, in which rl is the relative filling per stroke, ps is the intake manifold pressure, pirg is a partial pressure caused by residual gas in a combustion chamber, and fupsrl is a factor for converting the intake manifold pressure into the relative filling per stroke.

11. The method of claim 1, wherein the first balancing equation is a function of an air flow rate sucked into a combustion chamber.

12. The method of claim 1, wherein the first balancing equation is defined by the equation $d(ms)/dt=mdk\_Punkt-ma\_Punkt$, in which $d(ms)/dt$ is a change in air mass with respect to time, mdk_Punkt is an air flow rate through the throttle valve, and ma_Punkt is an air flow rate sucked into a combustion chamber.

13. The method of claim 1, wherein the relationship defined by the first balancing equation is $ps=KIS*integral((rlroh-rl)*dt)$, in which ps is the intake manifold pressure, KIS is an integration constant, rlroh is the relative air mass per stroke, and rl is the relative filling per stroke.

14. The method of claim 1, wherein the flow rate equation is a function of the mass flow through the throttle valve.

15. The method of claim 14, wherein the flow rate equation is further a function of a pressure upstream from the throttle valve.

16. The method of claim 1, wherein the flow rate equation is defined by the equation $msdk(wdkba)=pvdk*(1/(R*Tvdk))**(1/2)*Adk(wdkba)*my*Xi(Ps/pvdk)*k$, in which msdk is the mass flow through the throttle valve, wdkba is a throttle valve angle, pvdk is a pressure upstream from the throttle valve, Tvdk is a temperature upstream from the throttle valve, Adk is cross-section of an opening of the throttle valve, my is a coefficient of friction, and Xi is an outflow characteristic curve.

17. The method of claim 1, wherein the relationship defined by the flow equation is $rlroh=msdk/(n*KUMSRL)$, in which rlroh is the relative air mass per stroke through the throttle valve, msdk is the mass flow through the throttle valve, and KUMSRL is a conversion constant.

18. The method of claim 1, wherein the second balancing equation is a function of an air flow rate through the throttle valve.

19. The method of claim 1, wherein the relationship defined by the second balancing equation is $pl=KIL*integral(rlhfm-rlroh)*dt$, in which pl is the boost pressure, KIL is an integration constant, rlhfm is the air mass entering the internal combustion engine, and rlroh is the relative air mass through the throttle valve.

* * * * *